(12) United States Patent
Xie et al.

(10) Patent No.: US 12,411,839 B2
(45) Date of Patent: Sep. 9, 2025

(54) METHOD AND APPARATUS FOR CONTROLLING DATABASE TRANSACTION, AND RELATED DEVICE

(71) Applicant: Huawei Cloud Computing Technologies Co., Ltd., Guizhou (CN)

(72) Inventors: Xiaoqin Xie, Beijing (CN); Wenlong Ma, Beijing (CN); Zongquan Zhang, Gui'an (CN)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 0 days.

(21) Appl. No.: 18/613,534

(22) Filed: Mar. 22, 2024

(65) Prior Publication Data

US 2024/0265006 A1   Aug. 8, 2024

Related U.S. Application Data

(63) Continuation of application No. PCT/CN2022/115571, filed on Aug. 29, 2022.

(30) Foreign Application Priority Data

Sep. 23, 2021 (CN) .......................... 202111116354.9

(51) Int. Cl.
  *G06F 16/23*  (2019.01)
(52) U.S. Cl.
  CPC ................. *G06F 16/2379* (2019.01)
(58) Field of Classification Search
  CPC ...... G06F 16/2379; G06F 9/528; G06F 16/00; G06F 16/242; G06F 16/2455
  USPC .................................. 707/703, 755, 759, 769
  See application file for complete search history.

(56) References Cited

U.S. PATENT DOCUMENTS

| | | | | |
|---|---|---|---|---|
| 6,898,603 | B1* | 5/2005 | Petculescu | G06F 16/9574 707/999.002 |
| 10,726,002 | B1 | 7/2020 | Srivastava | |
| 2006/0074635 | A1* | 4/2006 | Gilbert | G06F 16/2438 704/9 |
| 2014/0310232 | A1* | 10/2014 | Plattner | G06F 16/24539 707/602 |
| 2018/0137184 | A1* | 5/2018 | Adamut | G06F 16/258 |
| 2018/0246950 | A1* | 8/2018 | Arye | G06F 16/2272 |
| 2018/0260196 | A1* | 9/2018 | Andrews | G06F 16/2453 |

OTHER PUBLICATIONS

Hal Berenson et al: "A Critique of ANSI SQL Isolation Levels", Proc. ACM SIGMOD 95, Jun. 1995, pp. 1-10.
S. Suma et al: "Proficient speculative execution model for SQL statements", 2013 IEEE International Conference on Computational Intelligence and Computing Research, Jan. 27, 2014, total 4 pages.

* cited by examiner

*Primary Examiner* — Phong H Nguyen
(74) *Attorney, Agent, or Firm* — Conley Rose, P.C.

(57) ABSTRACT

A method for controlling a database transaction, includes: receiving a structured query language (SQL) statement from a user equipment; setting a first speculation function of a first database transaction based on the SQL statement, where the first speculation function indicates that before a log of a second database transaction is committed, an operation record of the second database transaction is visible to the first database transaction; and performing an operation on the first database transaction based on the first speculation function.

20 Claims, 6 Drawing Sheets

| | tmin | tmax | | | Insert |
|---|---|---|---|---|---|
| Active | xid | INF | NULL | column | A |
| Committed | csn | INF | NULL | column | A |

FIG. 1A

| | tmin | tmax | | | Delete |
|---|---|---|---|---|---|
| Active | 20 | xid | NULL | column | B |
| Committed | 20 | csn | NULL | column | B |

FIG. 1B

| | tmin | tmax | | | Update |
|---|---|---|---|---|---|
| Active | 10 | xid | NULL | column | C |
|  | xid | INF | Oldv | column | D |
| Committed | 10 | csn | NULL | column | C |
|  | csn | INF | Oldv | column | D |

FIG. 1C

METHOD AND APPARATUS FOR CONTROLLING DATABASE TRANSACTION, AND RELATED DEVICE

CROSS-REFERENCE TO RELATED APPLICATIONS

This is a continuation of International Patent Application No. PCT/CN2022/115571 filed on Aug. 29, 2022, which claims priority to Chinese Patent Application No. 202111116354.9 filed on Sep. 23, 2021. The disclosures of the aforementioned applications are hereby incorporated by reference in their entireties.

TECHNICAL FIELD

This application relates to the field of database technologies, and in particular, to a method and an apparatus for controlling a database transaction, and a related device.

BACKGROUND

A speculation transaction is a transaction that supports speculation read or speculation neglect. Speculation read means that in a database system based on multi-version concurrency control (MVCC) or multi-version optimistic concurrency control (MVOCC), a row version that is being updated by another transaction in a preparing state can be read without waiting for a lock or a mutex identifier to be released. Speculation neglect means that in the database system based on MVCC or MVOCC, a row version that is being deleted by another transaction in the preparing state can be neglected without waiting for the lock or the mutex identifier to be released. Therefore, the speculation transaction can improve a degree of concurrency of a multi-transaction. This improves performance of a database system.

Although an existing database system supports a transaction to perform speculation read and speculation neglect on multi-version row data, the speculation transaction can be supported only at a system layer, and a user cannot control the speculation transaction. This affects user experience.

SUMMARY

Embodiments of this application provide a method and an apparatus for controlling a database transaction, and a related device, so that a user equipment can control a speculation function by using a Structured Query Language (SQL) statement. This improves user experience.

According to a first aspect, an embodiment of this application provides a method for controlling a database transaction. The method includes: receiving an SQL statement from a user equipment; setting a first speculation function of a first database transaction based on the SQL statement, where the first speculation function indicates that before a log of the second database transaction is committed, an operation record of the second database transaction is visible to the first database transaction; and performing an operation on the first database transaction based on the first speculation function.

The foregoing method may be applied to a server, and is performed by the server or a component (for example, a chip, a software module, or an integrated circuit) in the server.

In this embodiment of this application, a speculation function (for example, speculation read, speculation neglect, and speculation write) can improve a degree of concurrency of a multi-transaction. This improves performance of a database system. The server may set a speculation function of the database transaction based on the SQL statement from the user equipment, that is, the user may set the speculation function of the database transaction based on a requirement of the user, so that the user can activate a benefit brought by a speculation mechanism of the database system. This improves use experience of the user.

In a possible implementation of the first aspect, the setting a first speculation function of the first database transaction based on the SQL statement includes: parsing the SQL statement to obtain a speculation parameter; and invoking an interface of a storage engine based on the speculation parameter, to set a control variable in the storage engine, where the control variable indicates the first speculation function of the first database transaction.

It may be learned that the server may invoke the storage engine based on the SQL statement, and set a control variable of the speculation function of the database transaction, to control the speculation function.

In a possible implementation of the first aspect, the speculation parameter includes a parameter of speculation on/off and a parameter of a speculation level; and the parsing the SQL statement to determine a speculation parameter includes: parsing the SQL statement to obtain a keyword of the speculation on/off and a keyword of the speculation level; determining the parameter of the speculation on/off based on the keyword of the speculation on/off; and determining the parameter of the speculation level based on the keyword of the speculation level.

It may be learned that the server may parse the SQL statement to obtain the parameter of the speculation on/off used to control the speculation function and the parameter of the speculation level, so that the server may enable or disable the speculation function based on a requirement of the user equipment, and perform hierarchical control on the database transaction.

In a possible implementation of the first aspect, the invoking an interface of a storage engine based on the speculation parameter, to set a control variable in the storage engine includes: invoking the interface of the storage engine based on the parameter of the speculation level, to obtain a target object in the storage engine; and setting a control variable of the target object based on the parameter of the speculation on/off.

It may be learned that the server may invoke an interface of a corresponding storage engine based on the parameter of the speculation level, to obtain a target object corresponding to the speculation level, and enable a speculation function of the speculation level or disable the speculation function of the speculation level by setting a control variable corresponding to a target by using the parameter of the speculation on/off. In this way, hierarchical control on the speculation function of the data transaction can be implemented.

In a possible implementation of the first aspect, the parameter of the speculation level includes at least one of the following: a parameter of a system level, a parameter of a session level, a parameter of a transaction level, and a parameter of a statement level.

It may be learned that the server may implement speculation control of the system level, the session level, the transaction level or the statement level on the database transaction based on the requirement of the user equipment.

In a possible implementation of the first aspect, the performing an operation on the first database transaction based on the first speculation function includes: determining a second speculation function that has been set for the first target database transaction; and if a priority of the first speculation function is higher than a priority of the second speculation function, performing the operation on the first database transaction based on the first speculation function, where the priorities in ascending order include: the system level, the session level, the transaction level, and the statement level.

It may be learned that a priority exists in the speculation level, and a setting of a high priority may overwrite a setting of a low priority.

In a possible implementation of the first aspect, the setting a speculation function of a first database transaction based on the SQL statement includes: querying a cache based on the SQL statement; and if the SQL statement does not exist in the cache, setting the speculation function of the first database transaction based on the SQL statement.

It may be learned that, if the SQL statement used to set the speculation function exists in the cache, the speculation function does not need to be set based on the SQL statement; and if the SQL statement used to set the speculation function does not exist in the cache, the speculation function needs to be set based on the SQL statement. In this way, overheads caused by setting the speculation function may be reduced.

In a possible implementation of the first aspect, before the receiving an SQL statement from a user equipment, the method further includes: setting a speculation function of the system level of the first database transaction by loading a configuration file or a command line parameter.

In a possible implementation of the first aspect, the setting a system-level speculation function of the first database transaction by loading a configuration file or a command line parameter includes: loading the configuration file or the command line parameter to obtain an on/off parameter and a parameter of the system level; and setting a system variable of the database system based on the on/off parameter and the parameter of the system level, where the system variable indicates the speculation function of the system level of the first database transaction.

In a possible implementation of the first aspect, the setting a system variable of the database system based on the on/off parameter and the parameter of the system level includes: storing the on/off parameter and the parameter of the system level into a global variable of the database system; in an initialization process of the database system, obtaining the on/off parameter based on the parameter of the system level stored in the global variable; and setting the system variable based on the on/off parameter.

It may be learned that, in addition to receiving the SQL statement of the user equipment to set the speculation function of the system level, the server may also set the system-level speculation function by loading the configuration file or the command line parameter, to provide a plurality of manners of disposing the user equipment.

In a possible implementation of the first aspect, the setting a first speculation function of the first database transaction based on the SQL statement includes: parsing the SQL statement to obtain a speculation keyword; invoking the interface of the storage engine; and setting a speculation parameter of the interface based on the speculation keyword, where the speculation parameter indicates a speculation function of the statement level of the first database transaction.

It may be learned that the server may further set the speculation function of the statement level by using an interface parameter, to provide the plurality of manners of disposing the user equipment.

In a possible implementation of the first aspect, the performing an operation on the first database transaction based on the set first speculation function includes: performing the operation on the first database transaction based on the set first speculation function and the operation record of the second database transaction before the log of the second database transaction is committed.

It may be learned that the speculation function facilitates a multi-transaction to be concurrent. This improves the performance of the database system.

According to a second aspect, an embodiment of this application provides a method for controlling a database transaction. The method may include: generating an SQL statement; sending the SQL statement to a server, where the SQL statement is used to set a first speculation function of a first database transaction, and the first speculation function indicates that before a log of a second database transaction is committed, an operation record of the second database transaction is visible to the first database transaction; and receiving a setting result from the server.

The foregoing method may be applied to a user equipment, and is performed by the user equipment or a component (for example, a chip, a software module, or an integrated circuit) in the user equipment.

In a possible implementation of the second aspect, the SQL statement includes a parameter of speculation on/off and a parameter of a speculation level.

In a possible implementation of the second aspect, the parameter of the speculation on/off is used to enable the first speculation function or disable the first speculation function.

In a possible implementation of the second aspect, the parameter of the speculation level includes at least one of the following: a parameter of a system level, a parameter of a session level, a parameter of a transaction level, and a parameter of a statement level.

According to a third aspect, an embodiment of this application provides an apparatus for controlling a database transaction. The apparatus includes a processing unit and a communication unit, and the apparatus is configured to implement the method described in any one of the first aspect or the possible implementations of the first aspect.

In a possible implementation of the third aspect, the communication unit is configured to receive an SQL statement from a user equipment.

The processing unit is configured to set a first speculation function of a first database transaction based on the SQL statement, where the first speculation function indicates that before a log of a second database transaction is committed, an operation record of the second database transaction is visible to the first database transaction.

The processing unit is further configured to perform an operation on the first database transaction based on the first speculation function.

In a possible implementation of the third aspect, the processing unit is further configured to: parse the SQL statement to obtain a speculation parameter; and invoke an interface of a storage engine based on the speculation parameter, to set a control variable in the storage engine, where the control variable indicates the first speculation function of the first database transaction.

In a possible implementation of the third aspect, the processing unit is further configured to: parse the SQL statement to obtain a keyword of speculation on/off and a keyword of a speculation level; determine a parameter of the speculation on/off based on the keyword of the speculation on/off; and determine a parameter of the speculation level based on the keyword of the speculation level.

In a possible implementation of the third aspect, the processing unit is further configured to: invoke the interface of the storage engine based on the parameter of the speculation level, to obtain a target object in the storage engine; and set a control variable of the target object based on the parameter of the speculation on/off.

In a possible implementation of the third aspect, the parameter of the speculation level includes at least one of the following: a parameter of a system level, a parameter of a session level, a parameter of a transaction level, and a parameter of a statement level.

In a possible implementation of the third aspect, the processing unit is further configured to: determine a second speculation function that has been set for the first target database transaction; and if a priority of the first speculation function is higher than a priority of the second speculation function, perform the operation on the first database transaction based on the first speculation function, where priorities in ascending order include the system level, the session level, the transaction level, and the statement level.

In a possible implementation of the third aspect, the processing unit is further configured to: query a cache based on the SQL statement; and if the SQL statement does not exist in the cache, set the speculation function of the first database transaction based on the SQL statement.

In a possible implementation of the third aspect, the communication unit is further configured to set a speculation function of the system level of the first database transaction by loading a configuration file or a command line parameter.

In a possible implementation of the third aspect, the processing unit is further configured to: load the configuration file or the command line parameter to obtain an on/off parameter and a parameter of the system level; and set a system variable of a database system based on the on/off parameter and the parameter of the system level, where the system variable indicates the speculation function of the system level of the first database transaction.

In a possible implementation of the third aspect, the processing unit is further configured to: store the on/off parameter and the parameter of the system level into a global variable of the database system; in an initialization process of the database system, obtain the on/off parameter based on the parameter of the system level stored in the global variable; and set the system variable based on the on/off parameter.

In a possible implementation of the third aspect, the processing unit is further configured to: parse the SQL statement to obtain a speculation keyword; invoke the interface of the storage engine; and set a speculation parameter of the interface based on the speculation keyword, where the speculation parameter indicates a speculation function of the statement level of the first database transaction.

In a possible implementation of the third aspect, the processing unit is further configured to: perform the operation on the first database transaction based on the set first speculation function and the operation record of the second database transaction before the log of the second database transaction is committed.

According to a fourth aspect, an embodiment of this application provides an apparatus for controlling a database transaction. The apparatus includes a processing unit and a communication unit, and the apparatus is configured to implement the method described in any one of the second aspect or the possible implementations of the second aspect.

In a possible implementation of the fourth aspect, the processing unit is configured to generate a structured query statement SQL statement, where the SQL statement is used to set a first speculation function of a first database transaction, and the first speculation function indicates that before a log of a second database transaction is committed, an operation record of the second database transaction is visible to the first database transaction; the communication unit is configured to send the SQL statement to a server; and the communication unit is further configured to receive a setting result from the server.

In a possible implementation of the fourth aspect, the SQL statement includes a parameter of speculation on/off and a parameter of a speculation level.

In a possible implementation of the fourth aspect, the parameter of the speculation on/off is used to enable the first speculation function or disable the first speculation function.

In a possible implementation of the fourth aspect, the parameter of the speculation level includes at least one of the following: a parameter of a system level, a parameter of a session level, a parameter of a transaction level, and a parameter of a statement level.

According to a fifth aspect, an embodiment of this application provides a computing device. The computing device includes a processor and a memory. The memory stores a computer program; and when the processor executes the computer program, the computing device performs the method described in any one of the first aspect and the second aspect.

It should be noted that the processor included in the computing device described in the fifth aspect may be a processor (which is referred to as a dedicated processor for ease of differentiation) specially configured to perform the methods, or may be a processor that executes the methods by invoking the computer program, for example, a general-purpose processor. Optionally, at least one processor may alternatively include both the dedicated processor and the general-purpose processor.

Optionally, the computer program may be stored in the memory. For example, the memory may be a non-transitory (non-transitory) memory, for example, a read-only memory (ROM). The memory and the processor may be integrated on a same device, or may be separately disposed on different devices. A type of the memory and a manner of disposing the memory and the processor are not limited in this embodiment of this application.

In a possible implementation, at least one memory is located outside the computing device.

In still another possible implementation, the at least one memory is located in the computing device.

In still another possible implementation, a part of the at least one memory is located in the computing device, and the other part of the memories are located outside the computing device.

In this application, the processor and the memory may alternatively be integrated into one device. That is, the processor and the memory may alternatively be integrated together.

According to a sixth aspect, an embodiment of this application provides a computer-readable storage medium. The computer-readable storage medium stores instructions. When the instructions are run on at least one processor, the method described in any possible implementation of the first aspect and the second aspect is implemented.

According to a seventh aspect, this application provides a computer program product. The computer program product includes computer instructions; and when the instructions are run on at least one processor, the method described in any possible implementation of the first aspect and the second aspect is implemented. The computer program product may be a software installation package. If the foregoing method needs to be used, the computer program product may be downloaded and executed on a computing device.

For beneficial effects of the technical solutions provided in the second to the seventh aspects of this application, refer to beneficial effects of the technical solution in the first aspect. Details are not described herein again.

BRIEF DESCRIPTION OF DRAWINGS

The following describes accompanying drawings used in embodiments of this application.

FIGS. 1A-1C are schematic diagrams of an operation process of a single transaction on a multi-version data row according to an embodiment of this application;

DESCRIPTION OF EMBODIMENTS

Figure 2:
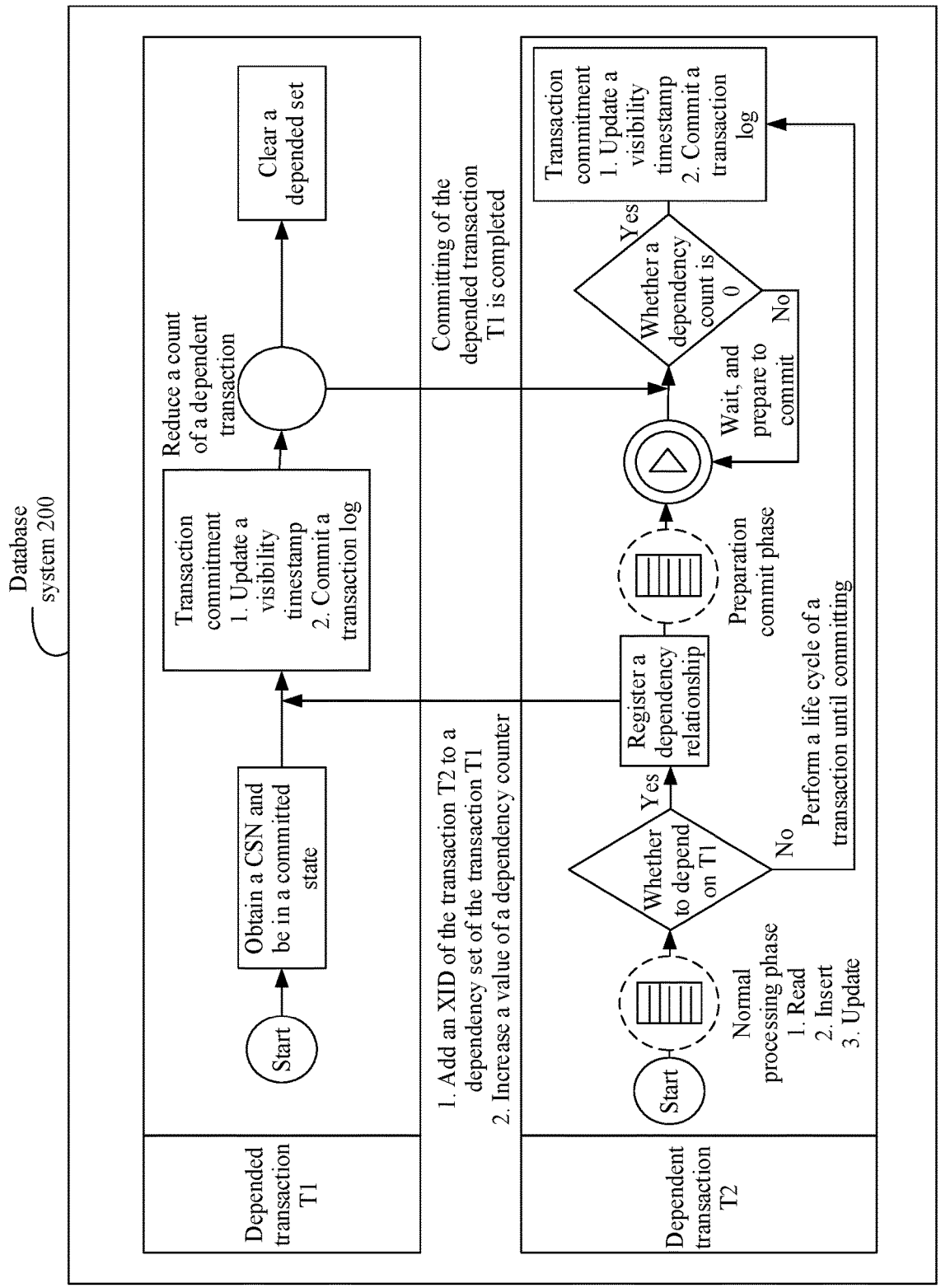
FIG. 2 is a schematic diagram of a principle of a speculation function according to an embodiment of this application.

The following describes embodiments of this application with reference to accompanying drawings in embodiments of this application.

For ease of understanding, some concepts related to embodiments of this application are described for reference by using examples. Details are as follows:

1. Database, Table, Field, and Index

A database (DB) is a warehouse that organizes, stores, and manages data based on a data structure. The database is a set of a large amount of organized and shared data stored in a computer.

A table is a structured file used to store specific types of data, such as student information and department directories. The data in the database is usually stored in a form of the table, and each table has a unique identifier, for example, a table name.

One table includes one or more columns. Each column is a field in the table, and each column stores a part of information in the table. For example, the database may include a table that is named as students, one column stores a student identification (referred to as a student ID) of a student, and one column stores a name of the student.

An index is a separate and physical storage structure that sorts values of one or more columns in a database table. The index is a set of values of one or more columns in a table and a list of logical pointers that point to corresponding data pages that physically identify the values in the table. A function of the index is similar to that of a book directory, and required content can be quickly found based on a page number in the directory.

2. Database Transaction

A transaction generally is what is to be done or what is done. A database transaction is a series of database operations that access and may operate various data items. These operations are either all directed or not performed. A database transaction is a non-separable unit of work. The transaction includes all database operations performed at a start and an end of the transaction.

In a relational database, a transaction may be an SQL statement, a group of SQL statements, or an entire program. The transaction is a basic unit for recovery and concurrency control. It has four attributes: atomicity, consistency, isolation, and durability. These four attributes are usually referred to as ACID features.

Atomicity: A transaction is a non-separable unit of work. All operations in the transaction are performed or none of the operations in the transaction is performed.

Consistency: The transaction needs to change the database from one consistency state to another. Consistency is closely related to atomicity.

Isolation: Execution of a transaction cannot be interfered by another transaction. That is, an operation and data used in a transaction are isolated from other concurrent transactions, and concurrent transactions cannot interfere with each other.

Durability: Durability is also referred to as permanence. Once committing of a transaction completes, a change on the data in the database should be permanent. Other subsequent operations or faults should not affect the data.

3. Distributed Transaction

A distributed transaction is a transaction participation mechanism, a transaction support server, a resource server, and a transaction manager that are located on different nodes of different distributed systems.

4. Structured Query Language

An SQL is a dedicated programming language, and is a database query and program design language used to access data and query, update, and manage a relational database system.

The SQL is an advanced non-procedural programming language that allows a user to work on a high-level data structure, and does not require the user to specify a data storage method or know a specific data storage method. Therefore, different database systems with different underlying structures can use same structured query language as a data input and a management interface.

5. Relational Database Management System (MySQL)

MySQL is a relational database management system. The relational database stores data in different tables instead of storing all data in a large warehouse. This increases a speed, and improves flexibility. An SQL language used by MySQL is the most commonly used standard language for accessing the database.

For ease of understanding embodiments of this application, a technical problem specifically to be resolved in this application is first proposed and analyzed.

Generally, a database system is usually designed based on a disk. The reason is that an early database system design is limited by hardware resources such as a single central processing unit (CPU), a single core, small available memory, and so on. It is unrealistic to store the entire database in the memory, and the database can only be stored on the disk. Therefore, in the standard database system, a primary storage medium of data is the disk. For example, a logical table is usually mapped to a file on the disk. The file is stored on the disk in a form of a data block, also referred to as a page. For structured data, a record is stored in a data block on the disk. A data block ID and an offset may indicate a specific location of the record. When a record is processed, the record may be obtained from the disk by using page ID+offset that represents an address of the record. Then the system reads the data block that stores the record from the disk to a buffer pool (buffer pool), and then reads the record from the buffer pool to a work area of a thread or an object for processing. After the processing is complete, the updated record is written back to a data block in the buffer pool, and then the database system writes the modified data block back to the disk.

In a disk-based database system, an entire index is usually loaded into memory when a query is processed, and a size of an index node in a B+ tree index usually uses a 16 kilobyte (KB) page design. Each indexed key value has a corresponding index item in an index leaf node, the index item includes a storage location of a record corresponding to the key value, and each page stores a data set of a plurality of records. To ensure data consistency without being damaged by concurrent access, the database system has two lock mechanisms, and they are respectively referred to as a lock and a latch. For example, the latch needs to be added when an operation is performed on a page in the buffer pool, and the lock needs to be added when database memory is modified. In order to meet atomicity of a transaction, the database system adopts an undo log. That is, before an operation is performed on any data, the data is backed up to a place (the place to which the data is backed up becomes the undo log), and then the data is modified. If an error occurs or a user executes a rollback statement, the system can use the backup in the undo log to restore the data to a state before the transaction starts.

It may be learned that the disk-based database system performs many extra management tasks. These tasks are not used to process service logic, but occupy system resources and affect system performance.

Compared with the disk-based database system, a memory-based database system redesigns a data index, and uses a prefix tree index, such as adaptive radix tree (ART). An index leaf no longer stores the page ID and the offset, but directly stores a memory address. The disk-based database system stores an index node in a data block. In contrast, an index node in a memory data block is one or more cache lines. An operation related to an index is not recorded into a log, and durability of the data is ensured by using the log and a check point mechanism. During recovery, a table and the index are recreated by using a latest check point and log. Multi-version optimistic concurrency control is used to provide isolation semantic without a lock. Using optimistic concurrency control and a multi-version and latch-free data structure, a thread of a memory database does not wait.

The memory database stores data by row. Each row has a plurality of versions. Data of each version mainly includes the following two parts: record header rhead and record data record. The two parts are separated or combined in space organization. Content of the record header rhead includes: {a rhead address of a previous version, a physical storage location}; and content of the record data record includes: {tmin, tmax, content data}. tmin and tmax are represented as timestamps, and a size is 64 bits. A most significant bit may be used to distinguish a transaction identifier (XID) or a globally increasing timestamp (timestamp). tmin represents a time when a record is created, and tmax represents a time when the record is deleted or modified. The timestamp increases monotonically in the system, and is determined when committing of the transaction completes. It is used to determine transaction visibility. tmax may alternatively be used as a mutex identifier. Content data can include a pointer (Oldv) pointing to a row of a previous version and content of a storage row (column).

To sum up, main differences between the disk-based database system and the memory-based database are shown in the following table (1):

TABLE 1

|  | Disk-based database system | Memory-based database system |
| --- | --- | --- |
| Concurrency control manner | latch | latch-free |
| Tree organization manner | Tree organized based on a page (or data block) structure | Tree organized based on a non-page (non-page) structure |
| Data recovery | undo-log | non-undo-log |
| Transaction concurrency control protocol | MVCC | MVOCC |

Optimizations including latch-free, non-page, non-undo-log, and MVOCC enable the memory-based database system to reduce unnecessary overheads, and use more system resources to process service logic. Therefore, performance of the database system is better than that of the standard disk-based database system. However, how to effectively control a speculation transaction in the memory-based database system to improve concurrency of a multi-transaction, to increase a quantity of transactions per second (TPS) is a problem that needs to be urgently resolved currently.

The following describes a process of performing an operation on a transaction in a memory-based database system.

First, a life cycle of a transaction is described. Generally, a complete transaction goes through a plurality of statuses from a start to committing. A transaction state is stored and maintained in a local transaction map. The transaction status includes one or more of the following:

1. Active state: The transaction obtains a begin timestamp (BeginTs), and performs a database operation corresponding to the transaction, for example, adding, deleting, modifying, and searching for an index and a row record.
2. Preparing state: The transaction obtains a commit timestamp (EndTs), writes a transaction log, and waits for an input/output (I/O) to complete.
3. Committed state: If the transaction log completes the I/O, the transaction is successfully committed, and the transaction status is updated to the committed state.
4. Aborted state: If an operation fails or is abnormal in the active or preparing state, the transaction is rolled back, and the transaction status is updated to the aborted state.

The following describes an operation process of a single transaction on a multi-version data row.

FIGS. 1A-1C are schematic diagrams of an operation process of a single transaction on a multi-version data row according to an embodiment of this application. It may be learned from FIGS. 1A-1C that an operation performed by the single transaction on a multi-version row includes one or more of the following: an insert operation, a delete operation, and an update operation.

FIG. 1A is a schematic diagram of an insert operation process. When the transaction is in the active state, the transaction obtains a begin timestamp, that is, a transaction identifier XID is allocated to the transaction. Then, the database system performs an operation of inserting a version A, and sets tmin of the version A to the XID. When the transaction is in the committed state, tmin of version A is updated to a commit sequence number (CSN). The CSN is a commit timestamp EndTs allocated to the transaction when the transaction is in the preparing state.

FIG. 1B is a schematic diagram of a delete operation process. When the transaction is in the active state, the transaction obtains a begin timestamp, that is, the transaction identifier XID is allocated to the transaction. Then, the database system performs an operation of deleting a version B, and sets tmax of the version B to the XID. When the transaction is in the committed state, tmax of the version B is updated to the CSN.

FIG. 1C is a schematic diagram of an update operation process. First, when the transaction is in the active state, the transaction obtains the begin timestamp, that is, allocates the transaction identifier XID to the transaction. Then, the database system performs an operation of updating a version C to a version D, sets tamx of the version C to the XID, then performs an operation of inserting the version D, sets tmin of the version D to the XID, and links oldv of the version D to the version C. When the transaction is in the committed state, tmax of the version C is updated to the CSN, and tmin of the version D is updated to the CSN.

The following describes an operation process of updating version row data in a concurrent manner under MVCC concurrency control.

Concurrency control and a version visibility check algorithm are involved when the multi-transaction performs a concurrency operation on version row data. The following table (2) describes two timestamps, a BeginTs and an EndTs, in a version record used to implement version visibility, and support transaction consistency and isolation under MVCC concurrency control.

TABLE 2

| Transaction operation type | BeginTs | EndTs | Visibility |
|---|---|---|---|
| In a process of inserting or updating a new record | XID | Infinity (INF) | Visible in a current transaction, and when another transaction reads a data row, perform an active rollback |
| Success in inserting or updating a new record | CSN 1 | INF | Visible in a transaction larger than the CSN 1 |
| In a process of updating or deleting an old record | CSN 1 | XID | Visible in a current transaction, invisible to another transaction, and perform abortion when the another transaction reads a data row |
| Success in updating or deleting an old record | CSN 1 | CSN 2 | Visible in a transaction larger than the CSN 1 and smaller than the CSN 2 |
| In a process of first performing inserting and then performing updating or deleting in a same transaction | XID | XID | Visible in a current transaction, invisible to another transaction, and perform an active rollback when the another transaction performs reading |
| Completion of first performing inserting and then performing updating or deleting in a same transaction | CSN 1 | CSN 1 | |

Invisible to another transaction means that version row data being modified by the current transaction is invisible to the another transaction. That is, under MVCC concurrency control, when the BeginTs or the EndTs is an XID, it indicates that a row lock is added to the version row data being modified. Therefore, when other data reads the version row data, an active rollback is performed. The version row data is invisible to the another transaction. Therefore, in a standard memory-based database system, MVCC concurrency control does not support a transaction speculation read scenario.

A target object to which embodiments of this application are applied is a speculation transaction, and the speculation transaction is a transaction that supports a speculation function. The speculation function includes speculation read and speculation neglect. Speculation read means that in an MVCC or MVOCC database system, a transaction can read row version data that is being updated by another transaction in the preparing state without waiting for the lock or the mutex identifier (XID) to be released. Speculation neglect means that in a database system based on MVCC or MVOCC, a transaction can neglect row version data that is being deleted by another transaction in the preparing state without waiting for the lock or the mutex identifier XID to be released.

In a concurrency control protocol without speculation read, if a transaction reads that version row data is being updated by another transaction, that is, the version row data is locked or an XID identifier is set, the transaction may have a mutex wait until a transaction that is being updated is committed, that is, release the lock or the mutex identifier, or perform the active rollback.

Therefore, speculation read can improve a degree of concurrency of the multi-transaction. This improves the performance of the database system.

FIG. 2 is a schematic diagram of a principle of a speculation function according to an embodiment of this application. A database system 200 supports transaction speculation at a memory engine level, may perform speculation read and speculation neglect on multi-version row data, perform speculation read on row data of a new version that is being inserted, and perform speculation neglect on row data of an old version that is being deleted. FIG. 2 shows a complete execution process in which a transaction T2 in the database system 200 depends on a transaction T1. In a life cycle of the transaction, when the transaction T2 is in the active state, the transaction T2 may perform a read operation, the insert operation, or the update operation. If transaction speculation occurs on the transaction T2, the transaction T2 needs to register a dependency relationship with a depended transaction T1, that is, add the XID allocated to the transaction T2 to a dependency set of the transaction T1, and increase a value of a dependency counter of the transaction T2. In a preparation commit phase of the dependent transaction T2, the dependent transaction T2 is in the preparing state. In this case, the dependent transaction T2 needs to wait for the depended transaction T1 to end the dependency relationship. That is, after the depended transaction T1 completes transaction committing (updates a visibility timestamp and commits a transaction log), the depended transaction T1 reduces a count of a dependent transaction, and notifies the dependent transaction T2 that committing of the depended transaction T1 has completed. In this case, the depended transaction T1 may clear a depended set. Therefore, the dependent transaction T2 may receive a notification indicating that committing of the dependent transaction T1 has completed. If committing of all transactions (only one depended transaction T2 is shown in FIG. 2, but not limited to one) on which the dependent transaction T2 depends complete, it indicates that when a dependency count of the dependent transaction T2 is 0, the dependent transaction may prepare for transaction committing. After the visibility timestamp is updated and the transaction log is committed, transaction committing completes.

It should be noted that, a principle of transaction speculation may include: Transactions may be executed out of order, but need to be executed in order to ensure data consistency; a speculation dependency relationship between the transactions is identified; and waiting of a speculation dependent transaction is managed, and polling or registration notification is blindly performed.

A purpose of transaction speculation may be to enable a new record to be visible to another transaction in advance before the transaction log is committed, avoiding blocking waiting. For normal transaction committing, a timestamp of the new record is updated after the transaction log is committed, so that visibility waiting of another transaction can be ended. However, in the speculation transaction, the timestamp of the new record is updated before the transaction log is committed, so that visibility waiting of another transaction can be ended in advance.

The following describes a process of concurrent update and speculation read of version row data under MVOCC concurrency control.

When a transaction T accesses a version V, if the BeginTs is an ID of a transaction TB, refer to Table (3) for processing items.

TABLE 3

| Status of a transaction TB | EndTs of TB | Processing of a transaction T |
|---|---|---|
| Active state | Not set | V.EndTs = infinity, where the version V is visible only to the transaction TB |
| Preparing state | A timestamp (TS) is obtained | The version V has not been committed, but V.BeginTs = TS<br>The transaction T uses TS to determine visibility<br>If visible, the transaction T may perform speculation read on the version V |
| Committed state | A TS is obtained | The version V has been committed, where V.BeginTs = TS<br>The transaction T uses the TS as a BeginTs to determine visibility |
| Aborted state | Unavailable | The version V is considered as junk, and the transaction T neglects the version V |
| No status is found | Unavailable | The transaction TB has ended<br>The Transaction T rereads BeginTs data of the version V |

When the transaction T accesses the version V, if the EndTs is an ID of a transaction TE, refer to Table (4) for processing items.

TABLE 4

| Status of a transaction TE | EndTs of TB | Processing of a transaction T (a read timestamp is RT) |
|---|---|---|
| Active state | Not set | V.EndTs = infinity, where the version V is visible only to the transaction TB |

TABLE 4-continued

| Status of a transaction TE | EndTs of TB | Processing of a transaction T (a read timestamp is RT) |
|---|---|---|
| Preparing state | A TS is obtained | The version V has not been committed, but V.EndTs = TS<br>TS > RT, where the version V is visible to the transaction T (BeginTs ≤ RT)<br>TS < RT, where the transaction T performs speculation neglect on the version V (deleted or updated) |
| Committed state | A TS is obtained | The version V has been committed, where V.EndTs = TS<br>The transaction T uses the TS as an EndTs to determine visibility |
| Aborted state | Unavailable | The version V is visible to the transaction T (the transaction TE fails to update) |
| No status is found | Unavailable | The transaction TB has ended<br>The transaction T rereads EndTs data of the version V |

It should be noted that, to ensure data consistency, transaction dependency processing needs to be performed before the speculation transaction is committed, for example, in Table (3) and Table (4). Committing of the transaction T depends on committing of the transaction TB and the transaction TE. If the dependent transaction is aborted, the transaction T needs to be aborted. Therefore, a data structure is needed in the transaction T to record a dependent transaction ID caused by a speculation behavior, and a result of the dependent transaction needs to be waited for signing in advance.

To sum up, a database system in the standard technology supports the transaction in performing speculation read and speculation neglect on multi-version row data, but has the following problems:

1. Transaction speculation can be performed only at a system level, and control on the speculation transaction cannot be implemented. For example, the speculation function is disabled or enabled based on a requirement of a user equipment, and layered and hierarchical control is performed on the speculation transaction based on the requirement of the user equipment.
2. The speculation transaction affects ecosystem compatibility of an original database. For example, the speculation transaction does not match semantics of MySQL. As a result, original service logic of the user equipment is incompatible.

Figure 3:
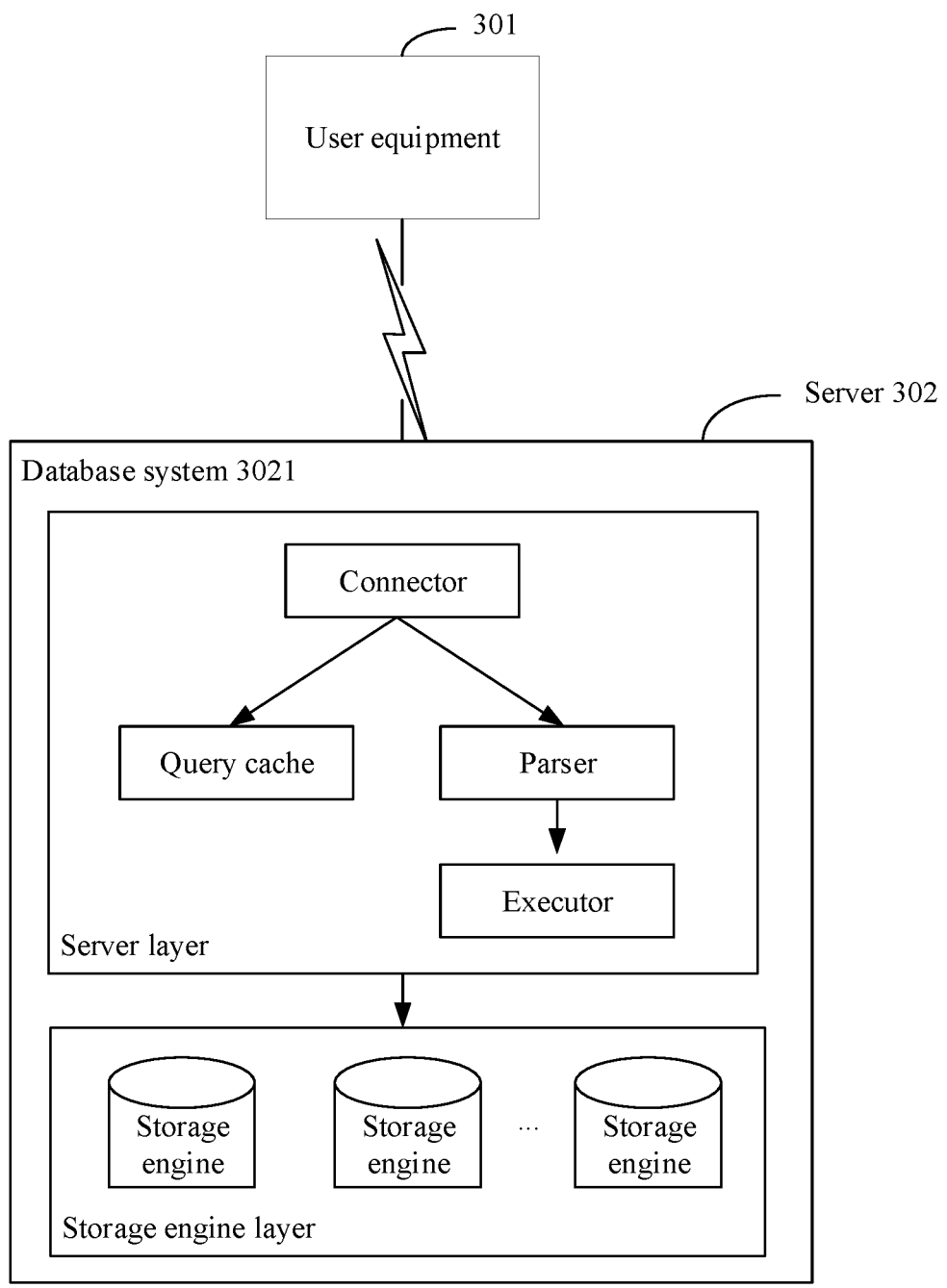
FIG. 3 is a schematic diagram of an architecture of a database transaction control system according to an embodiment of this application.

To resolve the foregoing technical problem, first, this application provides the following system. FIG. 3 is a schematic diagram of an architecture of a system for controlling a database transaction according to an embodiment of this application. A control system 100 may include at least one user equipment 301 and at least one server 302.

The user equipment 301 is an electronic device having a data processing capability and a data receiving and sending capability, and may implement a function of the foregoing client. For example, the user equipment 301 may include an independent device such as a handheld terminal, a wearable device, a vehicle, or a robot, or may be a component (for example, a chip or an integrated circuit) included in an independent device. For example, when a terminal apparatus is a handheld terminal, the terminal apparatus may be a mobile phone, a tablet computer (pad), a computer (such as a notebook computer or a palmtop computer), or the like.

The server 302 is an apparatus having the data processing capability and the data receiving and sending capability. It should be understood that the server is used as a term for description herein, and a specific form of the server 302 may be an entity apparatus such as the server or a host, or may be a virtual apparatus such as a virtual machine or a container. Optionally, the server 302 may be independently deployed in one device, or may be deployed in a plurality of devices in a distributed manner.

The server 302 is equipped with a database system 3021, and the database system 3021 includes a server layer and a storage engine layer. The server layer includes a connector, a query cache, a parser, and an executor. The storage engine layer includes one or more storage engines used by a current database, such as InnoDB, MyISAIM, and Memory.

Each user equipment 301 establishes a connection to the connector at the server layer, and the server 302 establishes a connection to the user equipment 301, obtains permission, and maintains and manages the connection through the connector.

After the connection between the server 302 and the user equipment 301 is established, the user equipment 301 may send an SQL statement to the server 302. The SQL statement is used to set a speculation function of a database transaction, for example, a speculation level of the speculation function, and enable or disable the speculation function. Therefore, after receiving the SQL statement from the user equipment 301, the server 302 may query a cache in the database system 3021 to check whether the SQL statement has been executed. It may be understood that a previously executed SQL statement and a result thereof may be cached in memory in a form of a key-value pair, that is, the server 302 may cache all SQL statements for which the speculation function is set. The key represents a queried SQL statement, and the value represents a query result.

If the SQL statement can find a corresponding key in the cache, it indicates that a speculation function corresponding to the SQL statement has been set, and does not need to be set again. In this case, the server 302 may return a value corresponding to the key to the user equipment 301. If the SQL statement is not in a query cache, the server 302 proceeds with a subsequent execution phase. After execution is completed, an execution result is stored in the query cache.

If the query cache is not hit, the parser at a sever layer can perform "lexical analysis" and "syntax analysis" on the SQL statement. The "lexical analysis" can parse the SQL statement to obtain a speculation parameter, for example, what character strings in the SQL statement respectively are and what they respectively represent. Based on a result of the "lexical analysis", the parser can determine, according to syntax rules, whether the SQL statement satisfies MySQL syntax.

Generally, the server layer may further include an optimizer, and an SQL statement that controls the speculation function of the database transaction does not need to be optimized through the optimizer. Therefore, the executor can set the speculation function of the database transaction based on the SQL statement.

In a possible design, the executor may invoke an interface of a storage engine based on the speculation parameter obtained by parsing the SQL statement by the parser, to set a control variable in the storage engine.

Further, the parser parses the SQL statement to obtain a speculation enable keyword and a keyword of a speculation level, determines a parameter of speculation on/off based on the speculation enable keyword, and determines a parameter of the speculation level based on the keyword of the speculation level.

Then, the executor may invoke the interface of the storage engine based on the parameter of the speculation level, to obtain a target object in the storage engine, and then set a control variable of the target object based on the parameter of the speculation on/off. The parameter of the speculation level includes at least one of the following: a parameter of a system level, a parameter of a session level, a parameter of a transaction level, and a parameter of a statement level. The parameter of the speculation on/off includes a parameter for enabling the speculation function and a parameter for disabling the speculation function.

It may be understood that parameters of different speculation levels correspond to different target objects. For example, a target object corresponding to the parameter of the system level may be systemEarlyCommit, a target object corresponding to the parameter of the session level may be sessionEarlyCommit, a target parameter corresponding to the parameter of the transaction level may be transactionEarlyCommit, and a target object corresponding to the parameter of the statement level may be subtransactionEarlyCommit.

Therefore, the server 302 may perform an operation on the database transaction based on the set speculation function. If the speculation function is a speculation function of the system level, the server 302 may support transaction speculation and transaction non-speculation for all SQL statements executed in all transactions of all sessions in the database system 3021. If the speculation function is a speculation function of the session level, the server 302 may support transaction speculation and transaction non-speculation for all SQL statements executed in all transactions from a session. If the speculation function is a speculation function of the transaction level, the server 302 may support transaction speculation and transaction non-speculation for all SQL statements executed in a transaction. If the speculation function is a speculation function of the statement level, the server 302 may support transaction speculation and transaction non-speculation for an SQL statement.

It should be understood that a communication link between the server 302 and the user equipment 301 may be a wired link, a wireless link, a combination of a wired link and a wireless link, or the like. Further, optionally, communication may be implemented by using one or more network technologies. A manner of communication between the server 302 and the user equipment 301 is not limited in this application.

In a possible design, the server 302 shown in FIG. 3 may be a cloud platform. The cloud platform includes a large quantity of basic resources (including but not limited to computing resources, storage resources, network resources, or the like) provided by a cloud service provider, where the computing resources may be a large quantity of computing devices (for example, servers and virtual machines).

It should be noted that, in this embodiment of this application, the cloud platform may be a cloud platform of a center cloud, a cloud platform of an edge cloud, or a cloud platform including a center cloud and an edge cloud. This is not specifically limited in this embodiment of this application. In addition, when the cloud platform is a cloud platform including the center cloud and the edge cloud, a database design system may be partially deployed on a cloud platform of the edge cloud, and partially deployed on a cloud platform of the center cloud.

The following describes in detail a method in an embodiment of this application.

Figure 4:
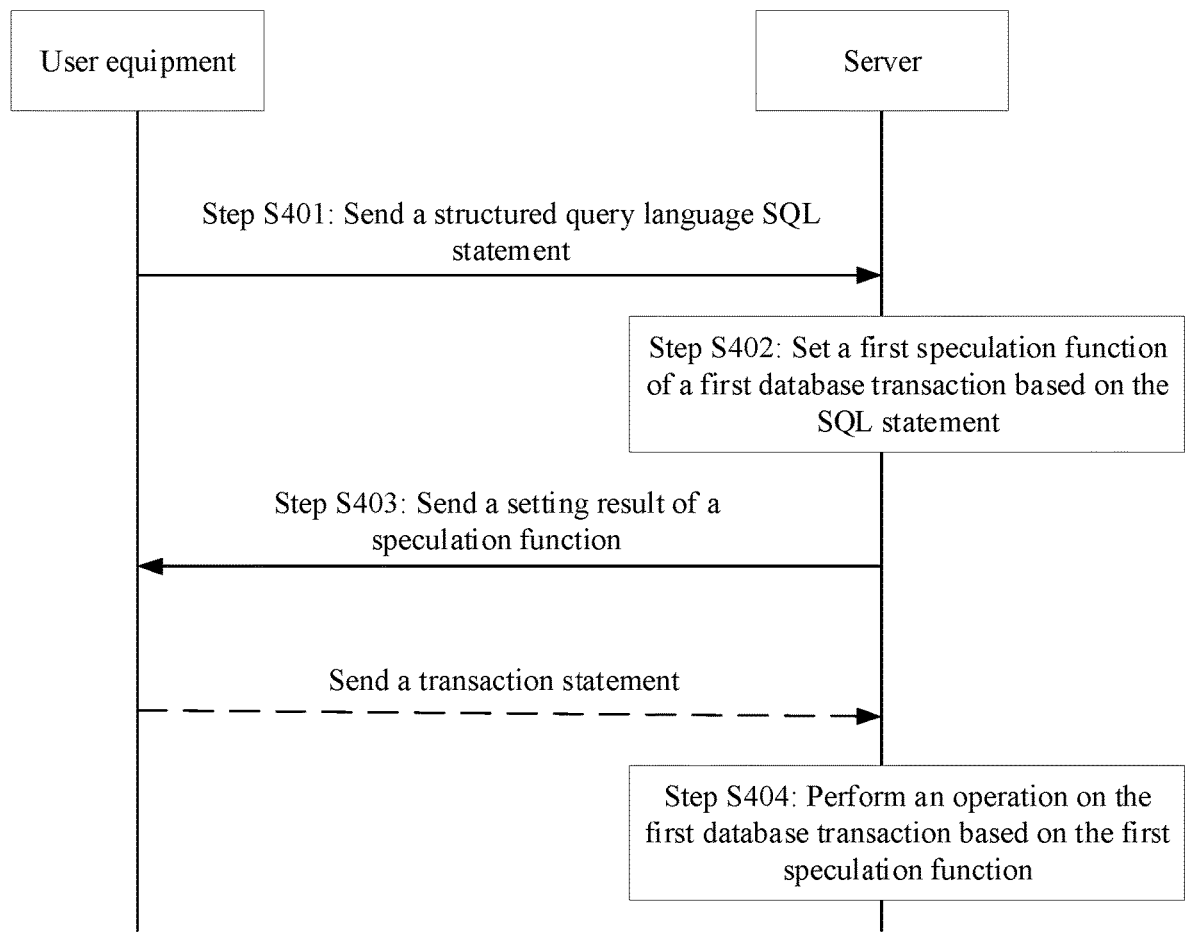
FIG. 4 is a flowchart of a method for controlling a database transaction according to an embodiment of this application.

FIG. 4 is a flowchart of a method for controlling a database transaction according to an embodiment of this application. The method may be used for the database system shown in FIG. 3.

The method for controlling the database transaction shown in FIG. 4 includes at least the following steps.

Step S401: A user equipment sends an SQL statement to a server.

Further, the server is a device on which a database system is running. When the user equipment needs to set a speculation level of a speculation function based on a requirement of the user equipment, the user equipment may send the SQL statement to the server.

In a possible implementation, different SQL statements are used to set different speculation levels. The speculation level may include a system level, a session level, a transaction level, and a statement level. An SQL statement of the system level may be "set system speculation on/off". An SQL statement of the session level may be "set session speculation on/off". An SQL statement of the transaction level may be "begin with speculation on/off". An SQL statement of the statement level may include: a read statement: "select XX from XXtable with speculation", an update statement: "update table set field=XX where precondition with speculation", and a delete statement: "delete from XXtable where precondition with speculation".

It should be noted that the SQL statement may be used to set a speculation function of a database transaction, but a parameter included in the SQL statement is not limited to that provided in this embodiment of this application.

Step S402: The server sets a first speculation function of a first database transaction based on the SQL statement.

Further, the server may receive, from the user equipment, an SQL statement used to set a speculation function of the system level, an SQL statement used to set a speculation function of the session level, an SQL statement used to set a speculation function of the transaction level, or an SQL statement used to set a speculation function of the statement level.

Because SQL statements are different, speculation functions corresponding to the SQL statements are also different. Therefore, the server may set a speculation function of a first data block transaction based on the SQL statement.

In a possible implementation, the server may parse the SQL statement to obtain a speculation parameter, and then invoke an interface of a storage engine based on the speculation parameter, to set a control variable in the storage engine. The speculation parameter may include a parameter of speculation on/off and a parameter of the speculation level, and the parameter of the speculation on/off indicates whether the speculation function is enabled or disabled. The parameter of the speculation level is used to set the speculation level of the speculation function.

Further, the server may parse the SQL statement to obtain a keyword of the speculation on/off and a keyword of the speculation level, determine the parameter of the speculation on/off based on the keyword of the speculation on/off, and determine the parameter of the speculation level based on the keyword of the speculation level.

For example, if the SQL statement is "set system speculation on/off", the server may parse the SQL statement to obtain that the keyword of the speculation level may be "set system speculation", and the keyword of the speculation on/off may be "on" or "off". Therefore, the server may determine, based on the keyword of the speculation level "set system speculation", that the speculation level (control level) is the system level, and a parameter corresponding to the system level may be 4. The server may determine, based on the keyword of the speculation on/off "on", that the parameter of the speculation on/off (isTxnspeculation) is 1. The server may determine, based on the keyword of the speculation on/off "off", that the parameter of the speculation on/off (isTxnspeculation) is 0.

If the SQL statement is "set session speculation on/off", the server may parse the SQL statement to obtain that the keyword of the speculation level may be "set session speculation", and the keyword of the speculation on/off may be "on" or "off". Therefore, the server may determine, based on the keyword of the speculation level "set session speculation", that the speculation level (control level) is the session level, and a parameter corresponding to the session level may be 3. The server may determine, based on the keyword of the speculation on/off "on", that the parameter of the speculation on/off (isTxnspeculation) is 1. The server may determine, based on the keyword of the speculation on/off "off", that the parameter of the speculation on/off (isTxnspeculation) is 0.

If the SQL statement is "begin with speculation on/off", the server may parse the SQL statement to obtain that the keyword of the speculation level may be "begin with speculation", and the keyword of the speculation on/off may be "on" or "off". Therefore, the server may determine, based on the keyword of the speculation level "begin with speculation", that the speculation level (control level) is the transaction level, and a parameter corresponding to the transaction level may be 2. The server may determine, based on the keyword of the speculation on/off "on", that the parameter of the speculation on/off (isTxnspeculation) is 1. The server may determine, based on the keyword of the speculation on/off "off", that the parameter of the speculation on/off (isTxnspeculation) is 0.

If the SQL statement is "select XX from XXtable with speculation", "update table set field=XX where precondition with speculation", or "delete from XXtable where precondition with speculation", the server may parse the SQL statement to obtain that the keyword of the speculation level may be "with speculation", and the keyword of the speculation on/off may be "select", "update", or "delete". Therefore, the server may determine, based on the keyword of the speculation level "with speculation", that the speculation level (control level) is the statement level (subtransaction level), and a parameter corresponding to the statement level (transaction level) may be 1. The server may determine, based on the keyword of the speculation on/off "select", "update", or "delete", that the parameter of the speculation on/off (isTxnspeculation) is 1. It may be understood that, because the speculation function of the statement level is for a determined statement, if the SQL statement used to set the speculation function of the statement level includes the keyword of the speculation level, it may indicate that the speculation function is enabled.

It may be understood that, a parameter "4" of the speculation level may correspond to the system level, a parameter of the speculation level "3" may correspond to the session level, a parameter of the speculation level "2" may correspond to the transaction level, and a parameter of the speculation level "1" may correspond to the statement level. "on" may indicate that the speculation function is enabled. Therefore, the parameter "1" of the speculation on/off corresponds to enabling the speculation function. "off" may indicate that the speculation function is disabled. Therefore, the parameter "0" of the speculation on/off corresponds to disabling the speculation function.

It should be noted that a value corresponding to the parameter of the speculation level and a value corresponding to the parameter of the speculation on/off are not limited to those provided in this embodiment of this application, and may be set based on an actual requirement.

Further, the parameter of the speculation level includes at least one of the following: a parameter of the system level, a parameter of the session level, a parameter of the transaction level, and a parameter of the statement level. Therefore, target objects in the storage engine corresponding to parameters of different speculation levels are also different. Therefore, the server may invoke the interface of the storage engine based on the parameter of the speculation level, to obtain a target object in the storage engine, and then set a control variable of the target object based on the parameter of the speculation on/off.

For example, a target object in a storage engine corresponding to the parameter of the system level may be g_server, and a global control variable used to control a transaction speculation on/off in the target object g_server may be systemEarlyCommit. Therefore, if the parameter of the speculation on/off is 1, a value of the control variable systemEarlyCommit is set to 1; and if the parameter of the speculation on/off is 0, the value of the control variable systemEarlyCommit is set to 0.

A target object in the storage engine corresponding to the parameter of the session level may be a session, and a local control variable used to manage the transaction speculation on/off in the target object session may be sessionEarlyCommit. Therefore, if the parameter of the speculation on/off is 1, a value of the control variable sessionEarlyCommit is set to 1; and if the parameter of the speculation on/off is 0, the value of the control variable sessionEarlyCommit is set to 0.

A target object in the storage engine corresponding to the parameter of the transaction level may be a transaction, and a local control variable used to control transaction speculation in the target object transaction may be transactionEarlyCommit. Therefore, if the parameter of the speculation on/off is 1, a value of the control variable transactionEarlyCommit is set to 1; and if the parameter of the speculation on/off is 0, the value of the control variable transactionEarlyCommit is set to 0.

A subtransaction of the statement level is initiated by default when SQL executes each SQL statement. Therefore, a target object in the storage engine corresponding to the parameter of the statement level may be a subtransaction, and a local control variable used to control transaction speculation in the target object subtransaction may be subtransactionEarlyCommit. Therefore, the server may set a value of the control variable subtransactionEarlyCommit to 1 based on that the parameter of the speculation on/off is 1.

Step S403: The server sends a setting result of the speculation function to the user equipment.

Further, after completing setting of the speculation function, the server may return the setting result to the user equipment. The setting result may be successfully set as an input parameter, for example, "Query OK, 1 rows affected (0.00 sec)".

In a possible implementation, after receiving the SQL statement from the user equipment, the server may query a cache in the database system to check whether the SQL statement has been executed. It may be understood that a previously executed SQL statement and a result thereof may be cached in memory in a form of a key-value pair, that is, a server 302 may cache all SQL statements for which the speculation function is set. The key represents a queried SQL statement, and the value represents a query result. If the SQL statement can find a corresponding key in the cache, it indicates that a speculation function corresponding to the SQL statement has been set, and does not need to be set again. In this case, the server 302 may return a value corresponding to the key to a user equipment 301. If the SQL statement is not in a query cache, the server 302 continues a subsequent execution phase, for example, performs step S402 and step S403. After step S402 and step S403 are performed, an execution result is stored in the query cache.

Step S404: The server performs an operation on the first database transaction based on the first speculation function.

Further, when a query statement from the user equipment is received, the target object in the storage engine may be read to determine a speculation level corresponding to the target object, and then a value of the control variable corresponding to the target is read to determine whether the speculation function is enabled. The server may perform an operation on the first database transaction based on a level corresponding to the speculation function. For example, if the level of the speculation function is the system level, all SQL statements of all transactions from all sessions executed by the server in the database system support transaction speculation or do not support transaction speculation. If the level of the speculation function is the session level, all SQL statements of all transactions executed by the server in the session support transaction speculation or do not support transaction speculation. If the level of the speculation function is the transaction level, all SQL statements executed by the server in a transaction support transaction speculation or do not support transaction speculation. If the level of the speculation function is the transaction level, the server supports transaction speculation or does not support transaction speculation for an SQL statement.

For example, if the target object is g_serve, the speculation level is the system level. If the value of systemEarlyCommit in the target object g_serve is 1, it indicates that speculation of the system level is enabled; and if the value of systemEarlyCommit in the target object g_serve is 0, it indicates that speculation of the system level is disabled.

If the target object is the session, the speculation level is the session level. If the value of sessionEarlyCommit in the target object session is 1, it indicates that speculation of the session level is enabled; and if the value of sessionEarlyCommit in the target object session is 0, it indicates that speculation of the session level is disabled.

If the target object is the transaction, the speculation level is the transaction level. If the value of transactionEarlyCommit in the target object transaction is 1, it indicates that speculation of the transaction level is enabled; and if the value of transactionEarlyCommit in the target object transaction is 0, it indicates that speculation of the transaction level is disabled.

If the target object is the subtransaction, the speculation level is the statement level. If the value of subtransactionEarlyCommit in the target object subtransaction is 1, it indicates that speculation of the statement level is enabled; and if the value of subtransactionEarlyCommit in the target object subtransaction is 0, it indicates that speculation of the statement level is disabled.

In a possible implementation, if the server determines, in the query cache, that a second speculation function has been set for the first target database transaction, but a priority of the first speculation function obtained by the server based on the SQL statement from the user equipment is higher than a priority of the second speculation function, the server may perform an operation on data of a first database based on the first speculation function. The priorities in ascending order include: the system level, the session level, the transaction level, and the statement level.

For example, if the second speculation function is disabling speculation of the system level, and the first speculation function is enabling speculation of the transaction level, because a priority of the transaction level is higher than a priority of the system level, the server may enable a speculation function of the transaction, and all SQL statements subsequently executed in the transaction may support transaction speculation. If the second speculation function is enabling speculation of the session level, and the second speculation function is disabling speculation of the transaction level, because the priority of the transaction level is higher than a priority of the session level, the server may disable the speculation function of the transaction, and all SQL statements subsequently executed in the transaction may not support transaction speculation, but other transactions in the session except the foregoing transaction may support transaction speculation.

In a possible implementation, for setting of a speculation function of the statement level, there is interface parameter setting, that is, an application programming interface (API) adds speculation parameter support. The server parses the SQL statement to obtain a speculation keyword, for example, "with speculation". A database system thread of the server processes a parsed operator, and invokes a related API interface of a storage engine layer. Then, the server may transfer, based on a feature of the speculation keyword, a speculation parameter option to a lower-layer memory engine when executing the API, that is, the server may invoke a corresponding API of the storage engine layer based on whether the SQL statement includes a transaction speculation keyword. Finally, the server may add a parameter indicating whether to speculate in an API interface of a data row and an index operation, and a default value is no. If the speculation keyword "with speculation" is obtained after parsing, a parameter supporting speculation is added to the API interface.

In a possible implementation, the server may further set a speculation function of the system level of the first database transaction by loading a configuration file or entering a command line parameter when the database system is started. That is, the user equipment does not need to send the SQL statement to the server to set the speculation function of the system level.

Further, before a database is started, whether a transaction speculation function is enabled may be configured by using a system configuration file. That is, a parameter of the system level for transaction speculation is added to a configuration file of the database system, for example, <SystemEarlyCommit>1</SystemEarlyCommit>, and <SystemEarlyCommit>0</SystemEarlyCommit>. When the parameter of the system level for transaction speculation is configured to "1", it indicates that the transaction speculation function is enabled; and when the parameter of the system level for transaction speculation is configured to "O", it indicates that the transaction speculation function is disabled.

Further, when a process of the database system is started, the command line parameter may be entered to configure the transaction speculation function, for example, the command line parameter may be # --speculation=on --xxx=X or # --speculation-off --xxx=X. When the command line parameter is configured to on, it indicates that the transaction speculation function is enabled; and when the command line parameter is configured to off, it indicates that the transaction speculation function is disabled.

Therefore, a process in which the server sets the speculation function of the system level of the first database transaction by loading the configuration file or the command line parameter includes the following steps:

S1: In a startup process of the database system, the server invokes a function (for example, load_defaults) to load the configuration file or the command line parameter, to obtain an on/off parameter and the parameter of the system level. For example, for the configuration file, the on/off parameter may be "1" or "0", and the parameter of the system level may be "System". For the command line parameter, the on/off parameter may be "on" or "off", and the parameter of the system level can be speculation.

S2: After execution of the function load_defaults ends, the server may store the parameter of the system level and the on/off parameter into a global variable of the database system. For example, the global variable may be remaining_argc and remaining_argv. The global variable can be used to initialize a system variable, and includes a parameter of the system variable, such as an on/off. argc is a quantity of the command line parameters, and argv is an array of the command line parameters.

S3: In the startup process of the database system, there are two functions that can enable the configuration file and the command line parameter to take effect. The two functions may be get_options(&remaining_argc,& remaining_argv) and handle_options (&remaining_argc,& remaining_argv).

S4: In an initialization process of the database system, the read configuration file and command line parameter are stored in the global variables remaining_argc and remaining_argv. In an execution process of the foregoing two functions, the two variables are used to initialize the variables. That is, the server may search for a corresponding on/off parameter based on the parameter of the system level stored in the global variable, and set the system variable SystemEarlyCommit based on the on/off parameter. For example, when the on/off parameter found by the server based on the parameter of the system level "System" is "1", the server sets the system variable SystemEarlyCommit to 1 based on the on/off parameter "1"; and when the on/off parameter found by the server based on the parameter of the system level "System" is "0", the server sets the system variable SystemEarlyCommit to 0 based on the on/off parameter "0". When the on/off parameter found by the server based on the parameter of the system level "speculation" is "on", the server sets the system variable SystemEarlyCommit to 1 based on the on/off parameter "on"; and when the on/off parameter found by the server based on the parameter of the system level "speculation" is "off", the server sets the system variable SystemEarlyCommit to 0 based on the on/off parameter "off".

Figure 5:
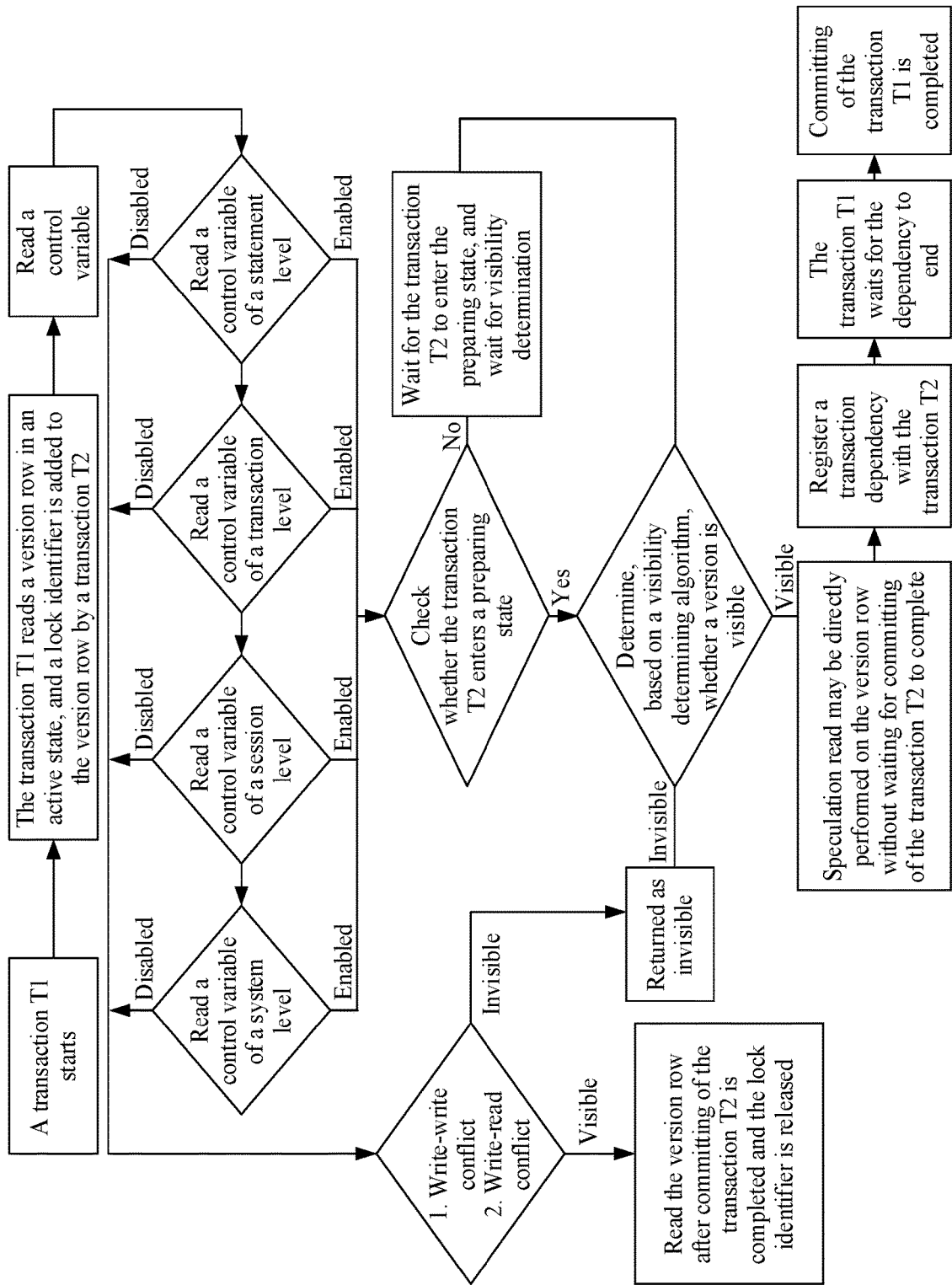
FIG. 5 is a schematic flowchart of a multi-level hierarchical control method supporting transaction speculation according to an embodiment of this application.

FIG. 5 is a schematic flowchart of a multi-level hierarchical control method supporting transaction speculation according to an embodiment of this application. It can be learned from FIG. 5 that, after a speculation function of a database transaction is set based on the method shown in FIG. 4, and after a transaction T1 starts, the transaction T1 reads a version row in an active state, and the version row is added with a lock XID by a transaction T2, that is, the transaction T2 is performing an operation on the version row. An electronic device may read one or more control variables that control a transaction speculation on/off in an order from a high priority to a low priority, where the priorities in descending order include: a session level, a transaction level, a statement level, and a system level. Therefore, a server may first read a control variable subtransaction of a subtransaction structure of the statement level. If a value of a control variable subtransactionEarlyCommit is 1, it may indicate that a speculation function of the statement level is enabled; and if the value of the control variable subtransactionEarlyCommit is 0, it may indicate that the speculation function of the statement level is disabled. The server may further read a control variable transaction of a transaction structure of the transaction level. If a value of a control variable transactionEarlyCommit is 1, it may indicate that a speculation function of the transaction level is enabled; and if the value of the control variable transactionEarlyCommit is 0, it may indicate that the speculation function of the transaction level is disabled. The server may further read a control variable sessionEarlyCommit of a transaction structure of the session level. If a value of a control variable sessionEarlyCommit is 1, it may indicate that a speculation function of the session level is enabled; and if the value of the control variable sessionEarlyCommit is 0, it may indicate that the speculation function of the session level is disabled. The server may further read a control variable systemEarlyCommit of the system level. If a value of a control variable systemEarlyCommit is 1, it may indicate that a speculation function of the system level is enabled; and if the value of the control variable systemEarlyCommit is 0, it may indicate that the speculation function of the system level is disabled.

When any one of the speculation function of the statement level, the speculation function of the transaction level, the speculation function of the session level, or the speculation function of the system level is enabled, the electronic device may check whether the transaction T2 enters a preparing state. If the transaction T2 enters the preparing state, the electronic device may determine whether version row data is visible based on a visibility determining algorithm. If the version row data is invisible, the version row data is returned as invisible. If the version row data is visible, speculation read may be directly performed on the version row without waiting for committing of the transaction T2 to complete. That is, a dependency relationship is registered with the transaction T2. After the transaction T1 enters the preparing state and before a transaction log is written, the transaction T2 waits for the dependency relationship to be ended. After the dependency relationship is ended, the transaction T1 can be committed.

When any one of the speculation function of the statement level, the speculation function of the transaction level, the speculation function of the session level, or the speculation function of the system level is disabled, if a write-write conflict occurs between the transaction T1 and the transaction T2, the transaction T1 is directly aborted; or if a read-write conflict occurs between the transaction T1 and the transaction T2, wait for visibility determination based on a transaction status, and determine, based on the visibility determining algorithm, whether the version row data is visible. If invisible, the version row data is returned as invisible. If visible, the version row data may be read after committing of the transaction T2 completes and the lock identifier is released.

To sum up, in this embodiment of this application, hierarchical control on a speculation transaction, and speculation control of the system level, the session level, the transaction level, and the statement level are implemented by extending an SQL statement parameter. For a speculation level corresponding to the SQL statement, refer to Table (5).

TABLE 5

| Speculation level | SQL statement | Priority |
| --- | --- | --- |
| System level | set system speculation on/off | Low |
| Session level | set session speculation on/off | Medium |
| Transaction level | begin with speculation on/off | High |
| Statement level | Read: select xx from xxtable with speculation<br>Update: update table set field = xx where precondition with speculation<br>Delete: delete from xxtable where precondition with speculation | Extremely high |

It may be understood that a transaction is a reliable and independent unit of work formed by a group of operations, and the transaction has ACID features, namely, atomicity, consistency, isolation, and durability. A local transaction is referred to as a local transaction when it is managed locally by a resource manager. An advantage of the local transaction is supporting strict ACID features. However, the local transaction does not have a capability of processing a distributed transaction. A minimum unit of isolation is limited by the resource manager. When globally managed by a global transaction manager, the transaction becomes a global transaction. The transaction manager manages a global transaction status and involved resources, and coordinates consistent committing and rollback of the resources.

In a transaction speculation process of the distributed transaction, based on a distribution periodicity of transaction execution, an execution process is divided into six phases: a start phase, a processing phase, a placement phase, an isolation phase, a preparation phase, and an end phase. For processing logic of each phase, refer to Table (6).

TABLE 6

| Processing phase | Global transaction | Local transaction |
| --- | --- | --- |
| S1: Start phase (sql.start_tx) | Create a global transaction, and record an isolation level | None |
| S2: Processing phase (sql.dml.stmt) | Obtain a beginTs when a first statement is executed | Create the local transaction to process a data operation (for example, ①write optimistic: install a record and an index; and ① write pessimistic: read cached data), and construct rset/wste/scanset in the local transaction based on an isolation level<br>For a record in a preparation phase, speculation read, speculation write, or speculation neglect may be performed, and wset is recorded<br>For a record in a commit phase, if beginTs > preTs, wait for visibility determination |
| S3: Placement phase (occ.Place) | Create an xid and notify all write participants to place data | Obtain preTs<br>Install the record and the index in order based on ② write pessimistic, and lock them<br>It should be noted that one of the two processing manners ① and ② is selected for processing |

TABLE 6-continued

| Processing phase | Global transaction | Local transaction |
| --- | --- | --- |
| S4: Isolation phase (occ.Validate) | Obtain an endTs (namely, a CSN) Notify write and read participants | Update an ensTs of the local transaction, or read visibility determination of an old version, to wake up the local transaction Verify rset and scanset |
| S5: Preparation phase (occ.Prepare) | Obtain the endTs, notify all participants to commit preparation in a concurrent manner, and notify read participants with speculation. When committing of a single-participant transaction completes, the xid is not needed | Update the endTs of the local transaction or read the visibility determination of the old version, to wake up the local transaction Set the local transaction to a preparing state, or a speculation time window of the transaction starts Wait for a speculation dependent transaction to be determined The write participants write a local transaction log redolog |
| S6: End phase (occ.Final) | Commit the xid, and invoke a notification API interface Send a final result FinalRequest to local transactions Cache status logs are written to disks in batches (participant status takeover and re-confirmation need to be implemented together) | None Update a record (record) status and release the local transaction, or the speculation time window of the transaction ends |

The following describes impact of the transaction speculation on/off on the transaction. Refer to Table (7).

TABLE 7

| Differences in processing records (record) in different statuses | Turn on speculation on/off (Early Commit ON) | Turn on the speculation on/off (Early Commit off) |
| --- | --- | --- |
| Record (record) of a transaction in a lock (lock) state | [sql.dml.stmt*] wait for visibility determination (CSN is determined) | [sql.dml.stmt*] same as Early Commit ON, wait |
| Record (record) of a transaction in an isolation (validate) state | [sql.dml.stmt*] wait for visibility determination (prepare state) That is, a log sequence number (LSN) of a current transaction is greater than or equal to a csn of a record, wait for a transaction of the record to enter the prepare state | [sql.dml.stmt*] same as Early Commit ON, wait |
| Record (record) of a transaction from the prepare state to a commit state | [sql.dml.stmt*] return a result to a user equipment client first [occ.Place] [occ.Validate] [occ.Prepare] wait for confirmation of a speculation dependent transaction in a concurrent manner, then writes a log, and writes triple-copy global memory (global memory, GM) | [sql.dml.stmt*] wait for visibility determination (Commit), to return a determining result to the client [occ.Place] [occ.Validate] [occ.Prepare] write the triple-copy GM |
| Impact of a client operation result | Assume that an LSN of a current transaction is equal to a CSN of the speculation dependent transaction | |
| SQL statement scenario | The client obtains result data of a speculation function through a data manipulation language DML. The speculation dependent transaction fails. As a result, committing of the current transaction fails, and isolation level compatibility is affected. Causes of the failure of the speculation dependent transaction are as follows: 1. A write participant A enters the prepare state and is speculated. However, a write participant B is faulty. The speculation dependent transaction is aborted. | The client performs an operation on a DML statement, to obtain result data in a stable state. |

TABLE 7-continued

| Differences in processing records (record) in different statuses | Turn on speculation on/off (Early Commit ON) | Turn on the speculation on/off (Early Commit off) |
|---|---|---|
| | 2. The write participant A enters the prepare state and is speculated, but a read participant B is faulty.<br>3. The write participant A enters the prepare state and is speculated. However, the write participants A and B fail to write the triple-copy GM.<br>4. The write participant A enters the prepare state and is speculated, but a coordinator C fails to commit GM. | |
| Storage process scenario | When the client executes a storage process, an intermediate result of a DML operation is not obtained. Data is obtained only after speculation is complete. The speculation is not affected. | None |
| Latency comparison analysis | Assume that an LSN of the current transaction is equal to a CSN of the speculation dependent transaction. The relationship is used as a time start point to compare which one of the two transactions can complete the occ.prepare phase first | |
| Duration of [dependent transaction] to occ.commit | validate -> prepare -> final, assume that there is no nested dependency | Same as left |
| Duration of [the current transaction] to occ.prepare | [sql.dml.stmt1] wait for visibility determination (prepare state) for a first time, that is, the user equipment client interacts with a server (sever) network [sql.dml.stmt2 . . . n] no need to wait for a second to nth times. That is, the dependent transaction is in a final state in this case. Therefore, a subsequent operation does not need to wait [occ.prepare] a plurality of participants wait for the speculation dependent transaction to be determined, and write GM in the concurrent manner | [sql.dml.stmt1] wait for visibility determination for the first time (wait from the prepare state to the commit state), that is, the user equipment client interacts with the sever network [sql.dml.stmt2 . . . n] no need to wait for the second to nth times, [occ.prepare] no waiting, and GM is written |
| Latency comparison conclusion | 1. The SQL statement scenario and a distributed transaction scenario help shorten an overall transaction latency<br>2. An SQL single-statement transaction scenario has a small benefit | |

The foregoing describes in detail the methods in embodiments of this application. The following provides an apparatus in embodiments of this application.

Figure 6:
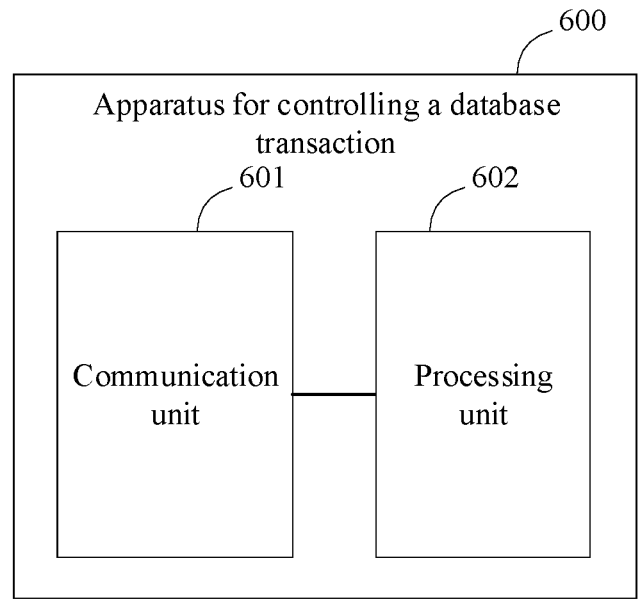
FIG. 6 is a schematic diagram of a structure of an apparatus for controlling a database transaction according to an embodiment of this application.

FIG. 6 is a schematic diagram of a structure of an apparatus 600 for controlling a database transaction according to an embodiment of this application. The apparatus 600 for controlling the database transaction may be a server or a user equipment, or may be a component in a server or a user equipment, for example, a chip, a software module, or an integrated circuit. The apparatus 600 for controlling the database transaction is configured to implement the foregoing method for controlling the database transaction, for example, the method in the embodiment shown in FIG. 4 or FIG. 5.

In a possible implementation, the apparatus 600 for controlling the database transaction may include a communication unit 601 and a processing unit 602.

In a possible design, the apparatus 600 for controlling the database transaction may be the server in the foregoing embodiment.

In a possible implementation, the communication unit is configured to receive an SQL statement from the user equipment.

The processing unit is configured to set a first speculation function of a first database transaction based on the SQL statement, where the first speculation function indicates that before a log of a second database transaction is committed, an operation record of the second database transaction is visible to the first database transaction.

The processing unit is further configured to perform an operation on the first database transaction based on the first speculation function.

The communication unit 601 is configured to receive the SQL statement from the user equipment.

The processing unit 602 is configured to set the first speculation function of the first database transaction based on the SQL statement, where the first speculation function indicates that before the log of the second database transaction is committed, the operation record of the second database transaction is visible to the first database transaction.

The processing unit 602 is further configured to perform the operation on the first database transaction based on the first speculation function.

In still another possible implementation, the processing unit 602 is further configured to: parse the SQL statement to obtain a speculation parameter; and invoke an interface of a storage engine based on the speculation parameter, to set a control variable in the storage engine, where the control variable indicates the first speculation function of the first database transaction.

In still another possible implementation, the processing unit 602 is further configured to: parse the SQL statement to obtain a keyword of speculation on/off and a keyword of a speculation level; determine a parameter of the speculation on/off based on the keyword of the speculation on/off; and determine a parameter of the speculation level based on the keyword of the speculation level.

In still another possible implementation, the processing unit 602 is further configured to: invoke the interface of the storage engine based on the parameter of the speculation level, to obtain a target object in the storage engine; and set a control variable of the target object based on the parameter of the speculation on/off.

In still another possible implementation, the parameter of the speculation level includes at least one of the following: a parameter of a system level, a parameter of a session level, a parameter of a transaction level, and a parameter of a statement level.

In still another possible implementation, the processing unit 602 is further configured to: determine a second speculation function that has been set for the first target database transaction; and if a priority of the first speculation function is higher than a priority of the second speculation function, perform the operation on the first database transaction based on the first speculation function, where the priorities in ascending order include: the system level, the session level, the transaction level, and the statement level.

In still another possible implementation, the processing unit 602 and the communication unit 601 are further configured to: query a cache based on the SQL statement; and if the SQL statement does not exist in the cache, set a speculation function of the first database transaction based on the SQL statement.

In still another possible implementation, the communication unit 601 and the processing unit 602 are further configured to: set a speculation function of the system level of the first database transaction by loading a configuration file or a command line parameter.

In still another possible implementation, the processing unit 602 is further configured to: load the configuration file or the command line parameter to obtain an on/off parameter and the parameter of the system level; and set a system variable of a database system based on the on/off parameter and the parameter of the system level, where the system variable indicates the speculation function of the system level of the first database transaction.

In still another possible implementation, the processing unit 602 is further configured to: store the on/off parameter and the parameter of the system level into a global variable of the database system; in an initialization process of the database system, obtain the on/off parameter based on the parameter of the system level stored in the global variable; and set the system variable based on the on/off parameter.

In still another possible implementation, the processing unit 602 and the communication unit 601 are further configured to: parse the SQL statement to obtain a speculation keyword; invoke the interface of the storage engine; and set a speculation parameter of the interface based on the speculation keyword, where the speculation parameter indicates a speculation function of the statement level of the first database transaction.

In still another possible implementation, the processing unit 602 is further configured to: perform the operation on the first database transaction based on the set first speculation function and the operation record of the second database transaction before the log of the second database transaction is committed.

In still another possible design, the apparatus 600 for controlling the database transaction may be the user equipment in the foregoing embodiments.

In a possible implementation, a processing unit 602 is configured to generate a structured query statement SQL statement, where the SQL statement is used to set a first speculation function of a first database transaction, and the first speculation function indicates that before a log of a second database transaction is committed, an operation record of the second database transaction is visible to the first database transaction.

A communication unit 601 is configured to send the SQL statement to a server; and the communication unit 601 is further configured to receive a setting result from the server.

In still another possible implementation, the SQL statement includes a parameter of speculation on/off and a parameter of a speculation level.

In still another possible implementation, the parameter of the speculation on/off is used to enable the first speculation function or disable the first speculation function.

In still another possible implementation, the parameter of the speculation level includes at least one of the following: a parameter of a system level, a parameter of a session level, a parameter of a transaction level, and a parameter of a statement level.

It should be understood that for related descriptions, refer to the descriptions in the embodiment shown in FIG. 4. Details are not described herein again.

Figure 7:
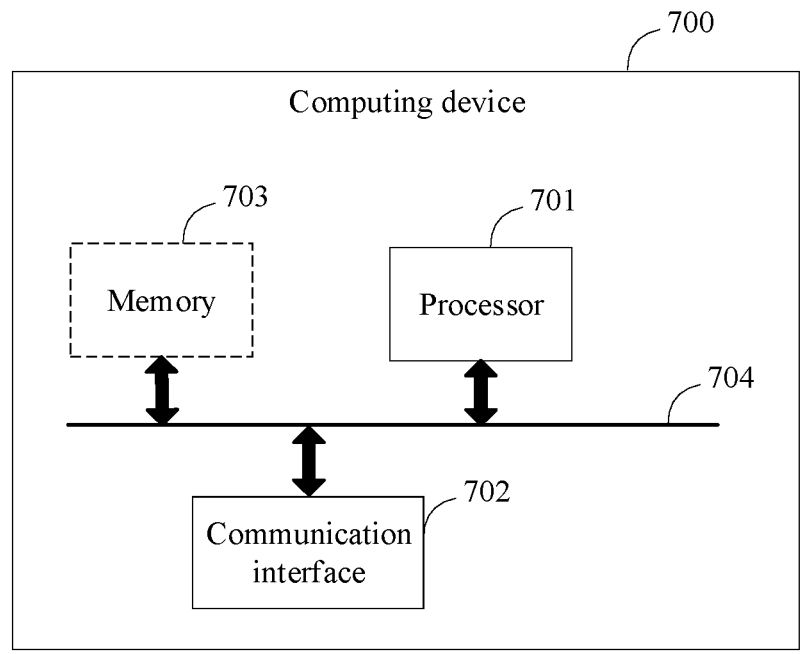
FIG. 7 is a schematic diagram of a structure of a computing device according to an embodiment of this application.

FIG. 7 is a schematic diagram of a structure of a computing device 700 according to an embodiment of this application. The computing device 700 may be an independent device (for example, one or more of a server or a user equipment), or may be a component (for example, a chip, a software module, or a hardware module) in an independent device. The computing device 700 may include at least one processor 701. Optionally, the computing device 700 may further include at least one memory 703. Further, optionally, the computing device 700 may further include a communication interface 702. Further, optionally, a bus 704 may be further included. The processor 701, the communication interface 702, and the memory 703 are connected through the bus 704.

The processor 701 is a module that performs an arithmetic operation and/or a logic operation, and may be one or a combination of more than one of processing modules such as a CPU, a graphics processing unit (GPU), a microprocessor (MPU), an application-specific integrated circuit (ASIC), a field-programmable gate array (FPGA), a complex programmable logic device (CPLD), a coprocessor (assisting the central processing unit in corresponding processing and application), or a microcontroller unit (MCU).

The communication interface 702 may be configured to provide information input or output for the at least one processor, and/or, the communication interface 702 may be configured to receive data sent from the outside and/or send data to the outside, and may be an interface of a wired link such as an Ethernet cable, or may be a wireless link (Wi-Fi, Bluetooth, universal wireless transmission, a vehicle-mounted short-distance communication technology, or another short-distance wireless communication technology) interface. Optionally, the communication interface 702 may further include a transmitter (for example, a radio frequency transmitter or an antenna) coupled to the interface, a receiver, or the like.

The memory 703 is configured to provide storage space, and the storage space may store data such as an operating system and a computer program. The memory 703 may be one or a combination of more than one of a random-access memory (RAM), a read-only memory (ROM), an erasable programmable read-only memory (EPROM), a compact disc read-only memory (CD-ROM), or the like.

At least one processor 701 in the computing device 700 is configured to perform the foregoing version management method, for example, the version management method described in the embodiment shown in FIG. 3 or FIG. 7.

Optionally, the processor 701 may be a processor (which is referred to as a dedicated processor for ease of differentiation) specially configured to execute these methods, or may be a processor that executes these methods by invoking the computer program, for example, a general-purpose processor.

Optionally, the at least one processor may alternatively include both the dedicated processor and the general-purpose processor.

Optionally, when the computing device includes the at least one processor 701, the computer program may be stored in the memory 703.

In a possible design, the computing device 700 may be the server in the foregoing embodiment.

In a possible implementation, the at least one processor 701 in the computing device 700 is configured to invoke computer instructions to perform the following operations: receiving a structured language SQL statement from a user equipment through the communication interface 702; setting a first speculation function of a first database transaction based on the SQL statement, where the first speculation function indicates that before a log of a second database transaction is committed, an operation record of the second database transaction is visible to the first database transaction; and performing an operation on the first database transaction based on the first speculation function.

In still another possible implementation, the processor 701 is further configured to: parse the SQL statement to obtain a speculation parameter; and invoke an interface of a storage engine based on the speculation parameter, to set a control variable in the storage engine, where the control variable indicates the first speculation function of the first database transaction.

In still another possible implementation, the processor 701 is further configured to: parse the SQL statement to obtain a keyword of speculation on/off and a keyword of a speculation level; determine a parameter of the speculation on/off based on the keyword of the speculation on/off; and determine a parameter of the speculation level based on the keyword of the speculation level.

In still another possible implementation, the processor 701 is further configured to invoke the interface of the storage engine based on the parameter of the speculation level, to obtain a target object in the storage engine; and set a control variable of the target object based on the parameter of the speculation on/off.

In still another possible implementation, the parameter of the speculation level includes at least one of the following: a parameter of a system level, a parameter of a session level, a parameter of a transaction level, and a parameter of a statement level.

In still another possible implementation, the processor 701 is further configured to determine a second speculation function that has been set for the first target database transaction; and if a priority of the first speculation function is higher than a priority of the second speculation function, perform the operation on the first database transaction based on the first speculation function, where the priorities in ascending order include: the system level, the session level, the transaction level, and the statement level.

In still another possible implementation, the processor 701 is further configured to: query a cache based on the SQL statement; and if the SQL statement does not exist in the cache, set a speculation function of the first database transaction based on the SQL statement.

In still another possible implementation, a speculation function of the system level of the first database transaction is set by loading a configuration file or a command line parameter through the communication interface 702.

In still another possible implementation, the processor 701 is further configured to: load the configuration file or the command line parameter to obtain an on/off parameter and a parameter of the system level; and set a system variable of a database system based on the on/off parameter and the parameter of the system level, where the system variable indicates the speculation function of the system level of the first database transaction.

In still another possible implementation, the processor 701 is further configured to: store the on/off parameter and the parameter of the system level into a global variable of the database system; in an initialization process of the database system, obtain the on/off parameter based on the parameter of the system level stored in the global variable; and set the system variable based on the on/off parameter.

In still another possible implementation, the processor 701 is further configured to: parse the SQL statement to obtain a speculation keyword; invoke the interface of the storage engine through the communication interface 702; and set a speculation parameter of the interface based on the speculation keyword, where the speculation parameter indicates a speculation function of the statement level of the first database transaction.

In still another possible implementation, the processor 701 is further configured to: perform the operation on the first database transaction based on the set first speculation function and the operation record of the second database transaction before the log of the second database transaction is committed.

In still another possible design, the computing device 700 may be the user equipment in the foregoing embodiments.

In a possible implementation, the at least one processor 701 in the computing device 700 is configured to invoke computer instructions to perform the following operations: generating an SQL statement, where the SQL statement is used to set a first speculation function of a first database transaction, and the first speculation function indicates that before a log of a second database transaction is committed, an operation record of the second database transaction is visible to the first database transaction; sending the SQL statement to a server through the communication interface 702; and receiving a setting result from the server through the communication interface 702.

In still another possible implementation, the SQL statement includes a parameter of speculation on/off and a parameter of a speculation level.

In still another possible implementation, the parameter of the speculation on/off is used to enable the first speculation function or disable the first speculation function.

In still another possible implementation, the parameter of the speculation level includes at least one of the following: a parameter of a system level, a parameter of a session level, a parameter of a transaction level, and a parameter of a statement level.

This application further provides a computer-readable storage medium. The computer-readable storage medium stores instructions. When the instructions are run on at least one processor, the foregoing version management method is implemented, for example, the method for controlling a database transaction shown in FIG. 4.

This application further provides a computer program product. The computer program product includes computer instructions. When the computer program product is executed by a computing device, the foregoing version management method is implemented, for example, the method for controlling a database transaction shown in FIG. 4.

In embodiments of this application, the word "example", "for example", or the like is used to represent giving an example, an illustration, or a description. Any embodiment or design scheme described as an "example" or "for example" in this application should not be construed as being more preferred or more advantageous than another embodiment or design scheme. To be precise, the terms such as "example" or "for example" are intended to present a related concept in a specific manner.

The expression "at least one" mentioned in embodiments of this application means one or more, and "a plurality of" means two or more. "At least one of the following items (pieces)" or a similar expression thereof is any combination of these items, including any combination of a singular item (piece) or plural items (pieces). For example, at least one (item) of a, b, or c may represent a, b, c, (a and b), (a and c), (b and c), or (a, b, and c), where a, b, and c each may be singular or plural. The term "and/or" describes an association between associated objects, and indicates that three relationships may exist. For example, A and/or B may indicate the following three cases: Only A exists, both A and B exist, and only B exists, where A and B may be singular or plural. The character "/" generally indicates an "or" relationship between the associated objects.

In addition, unless otherwise specified, in embodiments of this application, ordinal numbers such as "first" and "second" are used to distinguish between a plurality of objects, and are not used to limit an order, a time sequence, priorities, or degrees of importance of the plurality of objects. For example, a first device and a second device are merely for ease of description, and do not indicate a difference of the first device and the second device in terms of a structure and a degree of importance. In some embodiments, the first device and the second device may alternatively be the same device.

According to the context, the term "when" in the foregoing embodiments may be interpreted as a meaning "if", "after", "in response to determining", or "in response to detecting". The foregoing descriptions are merely optional embodiments of this application, but are not intended to limit this application. Any modification, equivalent replacement, improvement, or the like made within the concept and principle of this application shall fall within the protection scope of this application.

A person of ordinary skill in the art may understand that all or some of the steps of the foregoing embodiments may be implemented by hardware or a program instructing related hardware. The program may be stored in a computer-readable storage medium. The storage medium may be a read-only memory, a magnetic disk, or an optical disc.

What is claimed is:

1. A method comprising:
    receiving a structured query language (SQL) statement from a user equipment;
    setting a first speculation function of a first database transaction based on the SQL statement, wherein the first speculation function indicates that before a log of a second database transaction is committed, an operation record of the second database transaction is visible to the first database transaction; and
    performing, using the first speculation function, an operation on the first database transaction based on the operation record of the second database transaction before the log of the second database transaction is committed.

2. The method of claim 1, wherein setting the first speculation function of the first database transaction based on the SQL statement comprises:
    parsing the SQL statement to obtain a first speculation parameter; and
    invoking an interface of a storage engine based on the first speculation parameter in order to set a first control variable in the storage engine, wherein the first control variable indicates the first speculation function of the first database transaction.

3. The method of claim 2, wherein the first speculation parameter comprises a speculation on/off parameter and a speculation level parameter, and wherein parsing the SQL statement to determine the first speculation parameter comprises:
    parsing the SQL statement to obtain a first keyword and a second keyword;
    determining the speculation on/off parameter based on the first keyword; and
    determining the speculation level parameter based on the second keyword.

4. The method of claim 3, wherein invoking the interface of the storage engine based on the first speculation parameter in order to set the first control variable in the storage engine comprises invoking the interface of the storage engine based on the speculation level parameter in order to obtain a target object in the storage engine, and wherein the method further comprises setting a second control variable of the target object based on the speculation on/off parameter.

5. The method of claim 3, wherein the speculation level parameter comprises at least one of a parameter of a system level, a parameter of a session level, a parameter of a transaction level, or a parameter of a statement level.

6. The method of claim 5, wherein performing the operation on the first database transaction based on the first speculation function comprises:
    determining a second speculation function that has been set for the first database transaction; and
    performing, when a priority of the first speculation function is higher than a priority of the second speculation function, the operation on the first database transaction based on the first speculation function.

7. The method of claim 1, wherein setting the first speculation function of the first database transaction based on the SQL statement comprises:
    querying a cache based on the SQL statement; and
    setting, when the SQL statement does not exist in the cache, the first speculation function of the first database transaction based on the SQL statement.

8. The method of claim 1, wherein before receiving the SQL statement from the user equipment, the method further comprises setting a speculation function of a system level of the first database transaction by loading a configuration file or a command line parameter.

9. The method of claim 8, wherein setting the speculation function of the system level of the first database transaction by loading the configuration file or the command line parameter comprises:
- loading the configuration file or the command line parameter to obtain an on/off parameter and a system level parameter of the system level; and
- setting a system variable of a database system based on the on/off parameter and the system level parameter, wherein the system variable indicates the speculation function of the system level of the first database transaction.

10. The method of claim 9, wherein setting the system variable of the database system based on the on/off parameter and the system level parameter comprises:
- storing the on/off parameter and the system level parameter into a global variable of the database system;
- obtaining, in an initialization process of the database system, the on/off parameter based on the system level parameter stored in the global variable; and
- setting the system variable based on the on/off parameter.

11. The method of claim 1, wherein setting the first speculation function of the first database transaction based on the SQL statement comprises:
- parsing the SQL statement to obtain a speculation keyword;
- invoking an interface of a storage engine; and
- setting a speculation parameter of the interface based on the speculation keyword, wherein the speculation parameter indicates a speculation function of a statement level of the first database transaction.

12. An apparatus comprising:
- a memory configured to store a computer program; and
- one or more processors coupled to the memory and configured to execute the computer program to cause the apparatus to:
  - receive a structured query language (SQL) statement from a user equipment;
  - set a first speculation function of a first database transaction based on the SQL statement, wherein the first speculation function indicates that before a log of a second database transaction is committed, an operation record of the second database transaction is visible to the first database transaction; and
  - perform, using the first speculation function, an operation on the first database transaction based on the operation record of the second database transaction before the log of the second database transaction is committed.

13. The apparatus of claim 12, wherein the apparatus is further configured to:
- parse the SQL statement to obtain a first speculation parameter; and
- invoke an interface of a storage engine based on the first speculation parameter in order to set a first control variable in the storage engine, wherein the first control variable indicates the first speculation function of the first database transaction.

14. The apparatus of claim 13, wherein the apparatus is further configured to:
- parse the SQL statement to obtain a first keyword and a second keyword;
- determine a speculation on/off parameter based on the first keyword; and
- determine a speculation level parameter based on the second keyword.

15. The apparatus of claim 14, wherein the apparatus is further configured to:
- invoke the interface of the storage engine based on the speculation level parameter in order to obtain a target object in the storage engine; and
- set a second control variable of the target object based on the speculation on/off parameter.

16. The apparatus of claim 14, wherein the speculation level parameter comprises at least one of: a parameter of a system level, a parameter of a session level, a parameter of a transaction level, or a parameter of a statement level.

17. The apparatus of claim 16, wherein the apparatus is further configured to:
- determine a second speculation function that has been set for the first database transaction; and
- perform, when a priority of the first speculation function is higher than a priority of the second speculation function, the operation on the first database transaction based on the first speculation function, wherein the priorities in ascending order comprise: the system level, the session level, the transaction level, and the statement level.

18. The apparatus of claim 12, wherein the apparatus is configured to:
- query a cache based on the SQL statement; and
- set, when the SQL statement does not exist in the cache, the first speculation function of the first database transaction based on the SQL statement.

19. The apparatus of claim 12, wherein the apparatus is further configured to set a speculation function of a system level of the first database transaction by loading a configuration file or a command line parameter.

20. The apparatus of claim 19, wherein the apparatus is further configured to:
- load the configuration file or the command line parameter to obtain an on/off parameter and a system level parameter of the system level; and
- set a system variable of a database system based on the on/off parameter and the system level parameter, wherein the system variable indicates the speculation function of the system level of the first database transaction.

* * * * *